US009258294B2

(12) United States Patent
 Khalid et al.

(10) Patent No.: US 9,258,294 B2
(45) Date of Patent: Feb. 9, 2016

(54) REMOTE AUTHENTICATION METHOD WITH SINGLE SIGN ON CREDENTIALS

(71) Applicant: CELLCO PARTNERSHIP, Basking Ridge, NJ (US)

(72) Inventors: Mohammad Raheel Khalid, Budd Lake, NJ (US); Sm Masudur Rahman, Edison, NJ (US); Samir Vaidya, Highland Park, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 14/145,716

(22) Filed: Dec. 31, 2013

(65) Prior Publication Data

US 2015/0188907 A1    Jul. 2, 2015

(51) Int. Cl.
 *G06F 21/41* (2013.01)
 *H04L 29/06* (2006.01)

(52) U.S. Cl.
 CPC ............ *H04L 63/0815* (2013.01); *G06F 21/41* (2013.01)

(58) Field of Classification Search
 CPC ............................. H04L 63/0815; G06F 21/41
 See application file for complete search history.

(56) References Cited

U.S. PATENT DOCUMENTS

| | | | | |
|---|---|---|---|---|
| 7,512,973 B1* | 3/2009 | Chan | ....................... | H04L 63/10 380/272 |
| 2004/0230831 A1* | 11/2004 | Spelman | .................. | G06F 21/33 726/8 |
| 2005/0204148 A1* | 9/2005 | Mayo | .................. | H04L 63/0815 713/185 |
| 2006/0123234 A1* | 6/2006 | Schmidt | .............. | H04L 63/0209 713/168 |
| 2006/0230438 A1* | 10/2006 | Shappir | .................. | G06F 21/335 726/8 |
| 2009/0305673 A1* | 12/2009 | Mardikar | ...................... | 455/411 |
| 2010/0088753 A1* | 4/2010 | Ayres | ...................... | G06F 21/41 726/9 |
| 2012/0079577 A1* | 3/2012 | Hao et al. | .......................... | 726/7 |
| 2012/0144464 A1* | 6/2012 | Fakhrai | .................. | G06F 21/41 726/6 |
| 2012/0151210 A1* | 6/2012 | Perez | ...................... | G06F 21/35 713/168 |
| 2012/0311688 A1* | 12/2012 | Lemus et al. | ...................... | 726/8 |
| 2013/0086669 A1* | 4/2013 | Sondhi | ................ | H04L 63/0815 726/8 |
| 2014/0082715 A1* | 3/2014 | Grajek | ................ | H04L 63/0815 726/8 |
| 2014/0115341 A1* | 4/2014 | Robertson | ............. | H04L 9/3228 713/183 |
| 2014/0373126 A1* | 12/2014 | Hussain | .................. | H04L 63/08 726/9 |
| 2014/0373170 A1* | 12/2014 | Brudnicki et al. | ............... | 726/27 |
| 2015/0012995 A1* | 1/2015 | Korat | .................... | H04W 12/06 726/8 |
| 2015/0121501 A1* | 4/2015 | Khalid | ................ | H04L 63/0815 726/8 |

OTHER PUBLICATIONS

Fischer et al. Using SAP Logon Tickets for Single Sign on to Microsoft based web applications, Sep. 2004, Microsoft, p. 5-11.*

* cited by examiner

*Primary Examiner* — Joseph P Hirl
*Assistant Examiner* — Stephen Gundry (57) ABSTRACT

Systems and methods for remote authentication using Single Sign-On (SSO) credentials are disclosed. An implementation includes transmitting a request for an identification code from an application to a wireless service provider, the request provided through an encrypted transport protocol, receiving the identification code as a messaging service message from the wireless service provider, securely routing the received identification code to the requesting application, upon receipt of the identification code at the application, retrieving an authentication token for the application through the encrypted transport protocol and providing the authentication token to an application content server to allow content transfer between the application content server and the application.

20 Claims, 7 Drawing Sheets

REMOTE AUTHENTICATION METHOD WITH SINGLE SIGN ON CREDENTIALS

BACKGROUND

Single Sign-On (SSO) is a session/user authentication process that permits a user to enter one username and password in order to access multiple applications. The process authenticates the user for all applications the user has been given rights to and eliminates further prompts when the user switches applications during an authenticated session. SSO can reduce user fatigue resulting from providing different username and password combinations and also reduce time spent re-entering passwords for the same user identity. With SSO, an authentication service saves an authentication token to be shared among applications installed on a mobile device. The authentication token allows the applications to authenticate the user without requiring the user to re-enter a username and password combination for each application.

Several solutions rely on the operating system or user authorization to share the SSO authentication token between applications. However, these solutions do not protect against theft of a token in transport between servers or applications. As the foregoing illustrates, a new approach for SSO may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various implementations allow secure receipt of a SSO authentication token from a server and secure sharing of the SSO authentication token between applications. In an implementation, a process for secure receipt and sharing of a SSO authentication token between applications can be initiated when a request for an identification code is provided from an application on a mobile device to a subscriber profile controller of a wireless service provider. The request may be provided by the application through an encrypted transport protocol by utilizing a SSO function library associated with the application. The identification code may be a numeric or alpha-numeric string of characters, a hash value or any other identifier.

Responsive to the request for the identification code provided by the application, the identification code is received from the subscriber profile controller as a messaging service message (e.g., Short Messaging Service (SMS) message) and provided to the requesting application. Upon receipt of the identification code at the application, the application requests a SSO authentication token for the application from the subscriber profile controller. The application may use the received identification and device information, including, but not limited to, a device operating system version, a mobile directory number (MDN) and Subscriber Identification Module (SIM) credential to generate a hash. The hash may be provided by the application to the subscriber profile controller in order to receive a SSO authentication token from the subscriber profile controller. The subscriber profile controller provides the SSO authentication token to the application using the encrypted transport protocol. Upon receipt of the SSO authentication token at the application, the received application SSO authentication token (e.g. SSO token) can be provided by the application to an application content server to authenticate the application with the application content server. If the application content server authenticates the SSO authentication token, the application content server can allow content transfer between the application content server and the application.

Thus, an application may not be able to request an authentication token until it has received the identification code authorizing the application to proceed with the request for the authentication token. This allows only authorized applications (i.e., applications that possess an identification code from the subscriber profile controller) to obtain a SSO authentication token. Other un-authorized applications, including processes that may have malicious intent to improperly retrieve a user's SSO authentication token, are not able to retrieve the SSO authentication token from the subscriber profile controller. This not only improves security of the SSO authentication token but also security of a user's account with an application.

Furthermore, a SSO authentication token can be received securely by a requesting application via an encrypted transport protocol and the use of an identification code directed to the requesting application. In addition, once a SSO authentication token has been received, the SSO authentication token may be securely routed and shared with other applications by the application that requested the SSO authentication token. The application may have exclusive control over receipt of messaging service messages from the wireless service provider and may include parsing and routing rules to securely route (or share) the received SSO authentication token to any other application that may need the retrieved SSO authentication token. In this way, the sharing of an authentication token allows other applications to authenticate a user without requiring the user to re-enter a username and password combination for each application. Such sharing of the authentication token by the application is particularly beneficial for software platforms that may not allow direct communications between applications. These software platforms can include, but are not limited to, Windows Runtime Environments (e.g., X86, AMD64 and ARM desktops, laptops, tablets, etc.). Particularly, the disclosed implementations can enable sharing of the authentication token on such platforms based on parsing and routing rules defined for operating systems of the software platforms. These routing rules, defined by a token routing application, may be read by an operating system of the user's device to route a received authentication token to another application on the user's device. An example routing rule may indicate that when a messaging service message (with an identification code) including a particular prefix is detected at a modem of the user's device, the messaging service message is to be routed to a specific application. For example, a routing rule may indicate that when a SMS message is prefixed with "//VZW-MVM" the contents of the message, that may include an authentication token, are to be routed to the "My Verizon Mobile (MVM)) application on the user's mobile device. Furthermore, the identification code is transmitted by the subscriber profile controller as a messaging service message to a cellular modem of the mobile device upon checking that the mobile device is subscribed with the wireless service provider to receive such an authentication message. For example, a subscriber profile controller may review a subscriber database prior to providing the identification code to the mobile device. This ensures that the identification code reaches a device and application that is subscribed to receive remote SSO authentication services and the identification code.

Figure 1:
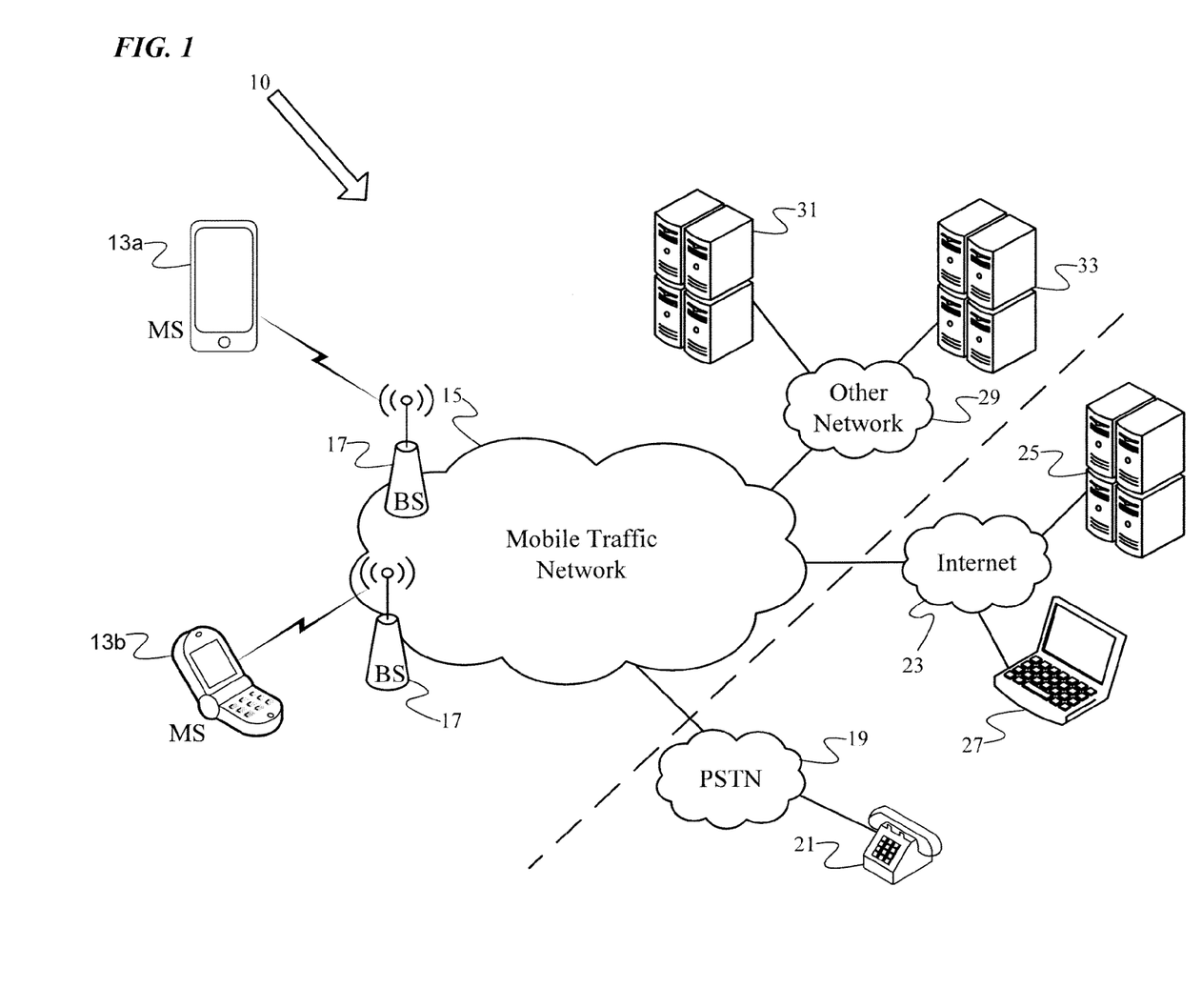
FIG. 1 is a high-level functional block diagram of an example of a system of networks/devices that provide various communications for mobile stations and support an example of the remote authentication using SSO.

Reference now is made in detail to the examples illustrated in the accompanying drawings and discussed below. FIG. 1 illustrates a system 10 offering a variety of mobile communication services, including communications for a remote authentication process with SSO credentials by mobile stations. The example shows simply two mobile stations (MSs) 13a and 13b as well as a mobile communication network 15. The stations 13a and 13b are examples of mobile stations that may use a remote authentication process with SSO credentials. However, the network will provide similar communications for many other similar users as well as for mobile devices/users that do not participate in the remote authentication process. The network 15 provides mobile wireless communications services to those stations as well as to other mobile stations (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, Long Term Evolution (LTE) or other standards used for public mobile wireless communications. The mobile stations 13 may are capable of voice telephone communications through the network 15, and for a remote authentication process with SSO credentials, the exemplary devices 13a and 13b are capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN 19. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13 via the Internet 23 may be with devices like those shown at 25 and 27 as well as with a variety of other types of devices or systems capable of data communications through various interconnected networks. The mobile stations 13a and 13b, including applications utilizing a remote authentication process with SSO credentials, also can receive and execute applications written in various programming languages, as discussed more later.

Mobile stations 13 can take the form of portable handsets, smart-phones or personal digital assistants, although they may be implemented in other form factors. Program applications, including an application (e.g., Mobile Broadband Account Experience (MBAE) application) to assist in remote authentication process with SSO credentials can be configured to execute on many different types of mobile stations 13. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serves mobile stations 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennas mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the PSTN and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related subscriber profile controller 33 for the application service of server 31.

A mobile station 13 communicates over the air with a base station 17 and through the traffic network 15 for various voice and data communications, e.g. through the Internet 23 with an application content server 25 and/or with application servers 31. If the mobile service carrier offers remote authentication with SSO credentials, the service may be provided using carrier operated subscriber profile controller 33, for communication via the networks 15 and 29. Alternatively, the remote authentication service may be provided by a separate entity (alone or through agreements with the carrier), in which case, the service may be hosted on an application server such as server 25 connected for communication via the networks 15 and 23. Servers such as 25 and 31 may provide any of a variety of common application or service functions in support of or in addition to an application program running on the mobile station 13. However, for purposes of further discussion, we will focus on functions thereof in support of remote authentication with SSO credentials in accordance with one or more implementations. For a given service, including remote authentication with SSO credentials, an application program within the mobile station may be considered as a 'client' and the programming at 33, 25 or 31 may be considered as the 'server' application for the particular service.

To insure that the application service offered by server 31 or application content server 25 is available to only authorized devices/users, the provider of the application service also deploys a subscriber profile controller 33. The subscriber profile controller 33 (e.g., SPC) can provide authentication and authorization for stations 13 seeking access to certain services, such as paid value-added services or applications, on the mobile communication network 15. The subscriber profile controller 33 can be used to verify whether a particular subscriber (e.g., a particular station 13) should be provided access to certain services or applications, for example by verifying whether the subscriber has a subscription for a service or application. The subscriber profile controller 33 could be a separate physical server as shown, or subscriber profile controller 33 could be implemented as another program module running on the same hardware platform as the server application 31. A similar authentication function may be provided for remote SSO authentication service(s) offered via the server 33, either by the server 33, by a program on the server 25 or via a separate subscriber profile controller (not shown) connected to the Internet 23.

Figure 2:
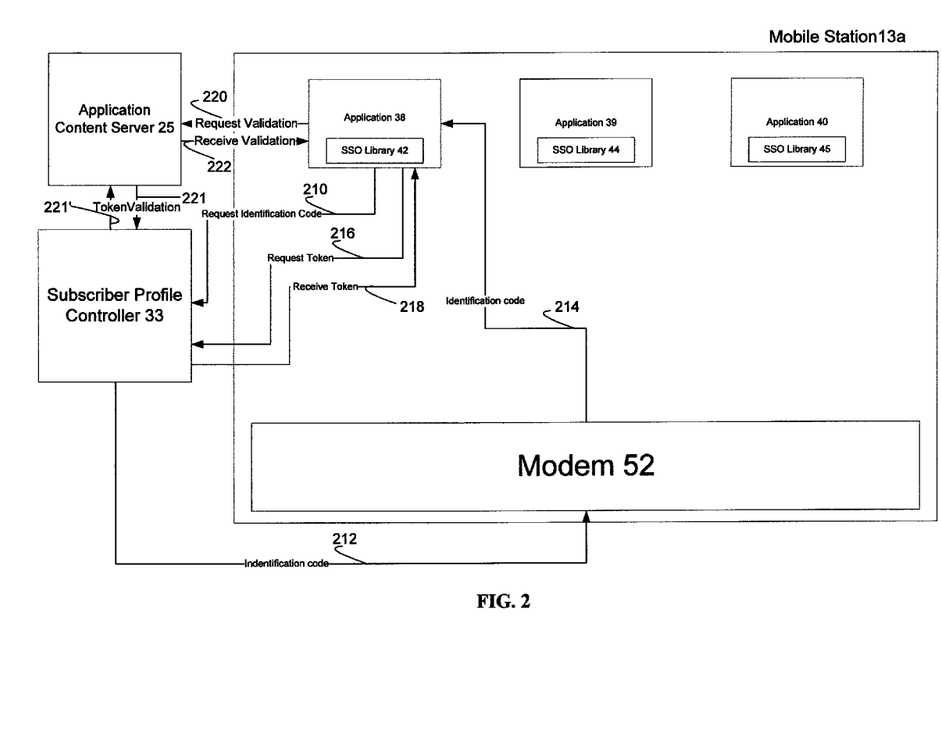
FIGS. 2-5 illustrate exemplary diagrams of a mobile station and exemplary interactions between the mobile station, an application content server and a subscriber profile controller.

Referring also to FIG. 2, in one implementation, a process for secure receipt and sharing of a SSO authentication token between applications can be initiated when a request for an identification code is provided from an application 38 on mobile station 13a to subscriber profile controller 33. In some implementations, the identification code may be specific to an application requesting the identification code. In other implementations, the identification code may be specific to another application sharing the identification code with the requesting application. In yet other implementations, the identification code may be specific to a device or a user. The request may be provided by the application 38 over mobile traffic network 15 through an encrypted transport protocol by utilizing a SSO function library associated with the application. The encrypted transport protocol may be Hyper Text Transfer Protocol-Secure (HTTPS). The request may be provided upon a user request to access or execute the application 38. Responsive to the request for the identification code provided by the application 38, the identification code is received as a messaging service message (e.g., Short Messaging Service (SMS) message and/or Multimedia Messaging Service (MMS)) from the subscriber profile controller 33 and provided to the requesting application 38 on mobile station 13a. The messaging service message including the identification code may be provided to a cellular modem 52 of mobile station 13a and routed to the application 38. In some implementations, the identification code may be directed to a specific application on the mobile device that includes application 38 or any other application that may be installed on the mobile device. As an example, a SMS message including the identification code may be prefixed with an identifier (e.g., //VZW-MVM) to indicate a particular application (e.g., My Verizon Mobile (MVM)) as the recipient of the SMS.

Upon receipt of the identification code at the application 38, the application 38 requests a SSO authentication token for the application 38 from subscriber profile controller 33. The application 38 may use the received identification code and device information of the mobile station 13a, including, but not limited to, a device operating system version, a mobile directory number (MDN) and Subscriber Identity Module (SIM) credential of the mobile station 13a to generate a hash value. The hash value may be provided by the application 38 to the subscriber profile controller 33 in the request for the authentication token to the subscriber profile controller 33. In some aspects, the subscriber profile controller 33 may verify the hash value against subscriber database prior to providing an authentication token to the application 38.

Thus, the application 38 may not be able to request an authentication token until it has received the identification code authorizing the application to proceed with the request for the authentication token. This allows only authorized applications (i.e., applications that possess an identification code from subscriber profile controller 33) to obtain a SSO authentication token. Other un-authorized applications, including processes that may have malicious intent to improperly retrieve a user's SSO authentication token, are not able to retrieve the SSO authentication token from subscriber profile controller 33. This not only improves security of the SSO authentication token but also security of a user's account with an application.

The subscriber profile controller 33 provides the SSO authentication token to the application using the encrypted transport protocol. Upon receipt of the SSO authentication token at the application 38, the received SSO authentication token (e.g. SSO token) can be provided by the application 38 to an application content server 25 to authenticate the application 38 with the application content server 25. If the application content server 25 authenticates the SSO authentication token, the application content server 25 can allow content transfer between the application content server 25 and the application 38. As an example, the application content server 25 may authenticate the SSO authentication token by comparing the SSO authentication token with an existing database of authorized SSO authentication tokens at application content server 25. Upon authentication, the content that may be transferred between the application 38 and application content server 25 may include any data, including, but not limited to, textual data, audio data, video data, control data, validation and authentication data, etc.

In this way, a SSO authentication token can be received securely by the requesting application 38 via an encrypted transport protocol and the use of an identification code directed to the requesting application 38. In addition, once an application SSO authentication token has been retrieved, the SSO authentication token may be securely routed and shared with other applications by application 38 on mobile station 13*a*. The application 38 may have exclusive control over receipt of messaging service messages from subscriber profile controller 33 and may include parsing and routing rules to securely route (or share) the received SSO authentication token to any other application on mobile station 13*a* that may need the retrieved SSO authentication token. These routing rules, defined by application 38, may be read by an operating system of mobile station 13*a* to further route the authentication to another application on the mobile station 13*a*. An example routing rule may indicate that when a SMS message (with an identification code) including a particular prefix is detected, the SMS message is to be routed to a specific application. For example, a routing rule may indicate that when a SMS message is prefixed with "//VZW-MVM" the contents of the message are to be routed to the "My Verizon Mobile (MVM)) application on mobile station 13*a*. In this way, in some implementations, the application 38 may act as a token routing application that configures routing of an authentication token to a requesting application based on routing rules defined by the application 38. In other implementations that are discussed below, a separate token routing application may route an authentication token to application 38 and other applications on mobile station 13*a*. Such sharing of the authentication token by the application 38 is particularly beneficial for software platforms that may not allow direct communications between applications. These software platforms can include, but are not limited to, Windows Runtime Environments (e.g., X86, AMD64 and ARM desktops, laptops, tablets, etc.). Particularly, and as discussed above, the disclosed implementations can enable sharing of the authentication token on such platforms based on parsing and routing rules defined for operating systems of the software platforms. These routing rules, defined by a token routing application, may be read by an operating system of a user's device to route an authentication token to an application on the user's device.

Application 38 may prevent access to the SSO authentication token while the token is being provided to or shared with another application by encrypting the authentication token during storage or transit. Because the authentication token is encrypted, other applications applications may not be able to access the authentication token during storage or transit. Instead, the application 38 would share the authentication tokens with the other applications based on requests from the other applications to application 38. In other words, other applications may not intercept or read the authentication token without making a request for the authentication token to application 38. Furthermore, the subscriber profile controller 33 checks that mobile station 13*a* is indeed subscribed to receive a SSO authentication token. In some aspects, and as discussed above, the subscriber profile controller 33 may verify a hash value provided by application 38 against a subscriber database prior to providing an authentication token to the application 38. This ensures that the identification code is transmitted by the subscriber profile controller 33 as a messaging service message to a cellular modem of the mobile station 13*a* authorized to receive the SSO authentication token.

FIG. 2 illustrates an exemplary diagram of the mobile station 13*a* and exemplary interactions between the mobile station 13*a* and the application content server 25 and the subscriber profile controller 33. The mobile station 13*a* includes applications 38-40. Application 38 may be a Mobile Broadband Account Experience (MBAE) application or any other software application. In some implementations, application 38 may be the only application that communicated with cellular modem 52 of mobile station 13*a*. The application 38 may set routing rules to allow an SMS including an identification code to be forwarded to other applications as noted above. Applications 38-40 may be other mobile device applications such as "apps" that are configured to connect to their respective content servers (e.g., content server 25) to retrieve content for display at mobile station 13*a*. Such retrieval may be performed, for example, using HTTP or HTTPS connections. For example, application 39, may create a request including an authentication token which is routed to the content server 25 via the Internet 23 (e.g., a network of DNS's, routers and switches) over HTTP. The content server 25 may receive the HTTP request and responds to the user with the web page (or content) which was requested upon verification of the authentication token. As an example, the token may be verified by the content server 25 by checking the token against a database of authorized tokens at the content server 25.

It is to be appreciated that mobile station 13*a* is not limited to applications 38-40 and can include any number of applications.

Applications 38-40 may include SSO function libraries 42, 44 and 45, respectively. In some implementations, the SSO function libraries 42, 44 and 45 may be implemented as dynamic link libraries (DLLs) (e.g., Windows DLLs). A DLL can be a library including shared data, code and any other resources required by an application. A DLL may be loaded by an operating system of mobile station 13 through an entry point in memory of mobile station 13*a*. Once loaded into memory, the DLL can execute operations on behalf of the application 38. As an example, the application 38 may perform operations related to remote authentication using SSO credentials by utilizing SSO function library 42. Exemplary flows of operation for different implementations shall now be described with respect FIGS. 2-5.

Referring to FIG. 2, in an implementation, a process for secure receipt and sharing of a SSO authentication token between applications can be initiated when a request for an identification code is provided from the application 38 on mobile station 13*a* to the subscriber profile controller 33 (step 210). The request may be provided by application 38 using the SSO function library 42 through an encrypted transport protocol. Such a request may be triggered, for example, when a user selects a button or any other user interface element to login into an application or when an application needs to access a user's data in another application using the user's SSO credentials.

Responsive to the request for the identification code provided by the application 38, the identification code is received as a messaging service message (e.g., Short Messaging Service (SMS) message) from the subscriber profile controller 33 (step 212) and provided to the requesting application 38 on mobile station 13*a* (step 214). As discussed above, the messaging service message may be provided via a cellular modem 52 of mobile station 13*a*. As an example, a SMS message including the identification code may be prefixed with an identifier (e.g., //VZW-MVM) to indicate a particular application (e.g., My Verizon Mobile (MVM)) as the recipient of the SMS. This ensures that the SMS message is routed to an application authorized to receive the message.

Upon receipt of the identification code at the application 38 (step 214), the application requests a SSO authentication token for the application 38 from subscriber profile controller 33 (step 216). As an example, the application 38 may use the received identification code and device information of the mobile station 13a, including, but not limited to, a device operating system version, a mobile directory number (MDN) and Subscriber Identity Module (SIM) credential of the mobile station 13a, to generate a hash value. The hash value may be generated by SSO function library 42. The hash value may be provided by the application 38 to the subscriber profile controller 33 in the request for the authentication token. In some aspects, the subscriber profile controller 33 may verify the hash value against a subscriber database prior to providing an authentication token to the application 38.

The subscriber profile controller 33 provides the SSO authentication token to the application using the encrypted transport protocol (step 218).

Upon receipt of the SSO authentication token at the application 38, the received SSO authentication token (e.g. SSO token) can be provided by the application 38 to an application content server 25 to authenticate the application 38 with the application content server 25 (step 220). Additionally, the application content server 25 may also validate the token with the subscriber profile controller 33. For example, the subscriber profile controller may receive the authentication token from application content server 25 (step 221), check the authentication token against a database of one or more authorized authentication tokens and provide the validated the authentication token to the application content server (step 221'). When the application content server 25 authenticates the SSO authentication token (step 222), the application content server 25 can allow content transfer between the application content server 25 and the application 38.

In this way, a SSO authentication token can be received securely by the requesting application 38 via an encrypted transport protocol and the use of an identification code directed to the requesting application 38 via the cellular modem 52. In addition, once a SSO authentication token has been received, the SSO authentication token may be securely routed and shared by an operating system of mobile station 13a, based on routing rules defined by application 38, with other applications 39 and 40 on mobile station 13a.

Figure 3:
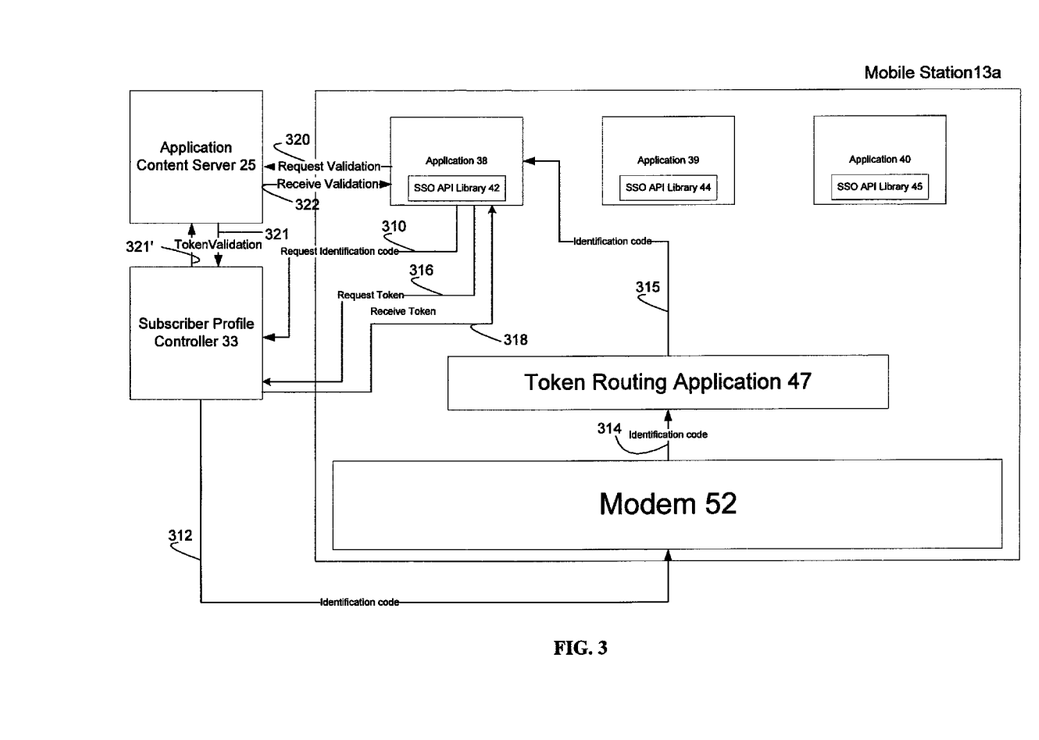

FIG. 3 illustrates an implementation of remote authentication using SSO credentials where a user of mobile station 13a may be prompted to manually enter an identification code that has been provided by the subscriber profile controller 33 as a messaging service message to mobile station 13a. Similar to FIG. 2, in FIG. 3, a process for secure receipt and sharing of a SSO authentication token between applications can be initiated when a request for an identification code is provided from the application 38 on mobile station 13a to the subscriber profile controller 33 (step 310). The request may be provided by application 38 using the SSO function library 42 through an encrypted transport protocol.

Responsive to the request for the identification code provided by the application 38, the identification code is received as a messaging service message (e.g., Short Messaging Service (SMS) message) from the subscriber profile controller 33 (step 312) and provided to the token routing application 47 on mobile station 13a (step 314). As discussed above, the messaging service message may be provided via the cellular modem 52 of mobile station 13a.

The token routing application 47 may then request the user to provide or enter the identification code via a user interface of the mobile device. As an example, the user may read the received identification code from a message inbox of mobile station 13a and then provide the identification code via the user interface. Once the user enters the identification code via the user interface, the identification code is then routed to the requesting application 38 (step 315). In this way, the user may be manually required to enter an authentication code to ensure that the user is granting explicit access to the token routing application 47 to request an authentication token that may be needed to authenticate applications for the user. In some implementations, other security measures may be used, including, but not limited to, adding a user name or any other user or device identifier to the identification code being provided by the user via the user interface.

Upon receipt of the identification code at the application 38, the application requests a SSO authentication token for the application 38 from subscriber profile controller 33 (step 316). Thus, the application 38 may not be able to request an authentication token until it has received the identification code authorizing the application to proceed with the request for the authentication token. This allows only authorized applications (i.e., applications that possess an identification code from subscriber profile controller 33) to obtain a SSO authentication token. Other un-authorized applications, including processes that may have malicious intent to improperly retrieve a user's SSO authentication token, are not able to retrieve the SSO authentication token from subscriber profile controller 33. This not only improves security of the SSO authentication token but also security of a user's account with an application.

The subscriber profile controller 33 provides the SSO authentication token to the application using the encrypted transport protocol (step 318). Upon receipt of the SSO authentication token at the application 38, the received SSO authentication token can be provided by the application 38 to an application content server 25 to authenticate the application 38 with the application content server 35 (step 320). Additionally, the application content server 25 may also validate the token with the subscriber profile controller 33. For example, the subscriber profile controller may receive the authentication token from application content server 25 (step 321) check the authentication token against a database of one or more authorized authentication tokens and provide the validated the authentication token to the application content server (step 321'). When the application content server 25 authenticates the SSO authentication token (step 322), the application content server 25 can allow content transfer between the application content server 25 and the application 38.

In this way, a SSO authentication token can be received securely by the requesting application 38 via an encrypted transport protocol and the use of an identification code directed to the requesting application 38. In addition, once a SSO authentication token has been retrieved, the SSO authentication token may be securely routed and shared by an operating system of mobile station 13a, based on routing rules defined by token routing application 47, with other applications 39 and 40 on mobile station 13a. Routing rules, defined by the token routing application 47, may be read by an operating system of mobile station 13a to route the message to an application on the mobile station 13a. In this way, in some implementations, the token routing application 47 may act to configure routing of an authentication token to a requesting application (e.g., application 38) based on routing rules defined by the token routing application 47. These routing rules, defined by token routing application 47, may be read by an operating system of mobile station 13a to further route the authentication to another application on the mobile station 13a. An example routing rule may indicate that when a SMS message (with an identification code) including a particular prefix is detected, the SMS message is to be routed to a specific application. For example, a routing rule may indicate that when a SMS message is prefixed with "//VZW-MVM" the contents of the message are to be routed to the "My Verizon Mobile (MVM)) application on mobile station 13a.

The application 38 may not be able to request an authentication token until it has received the identification code authorizing the application to proceed with the request for the authentication token. This allows only authorized applications (i.e., applications that possess an identification code from subscriber profile controller 33) to obtain a SSO authentication token. Other un-authorized applications, including processes that may have malicious intent to improperly retrieve a user's SSO authentication token, are not able to retrieve the SSO authentication token from subscriber profile controller 33. This not only improves security of the SSO authentication token but also security of a user's account with an application.

Figure 4:
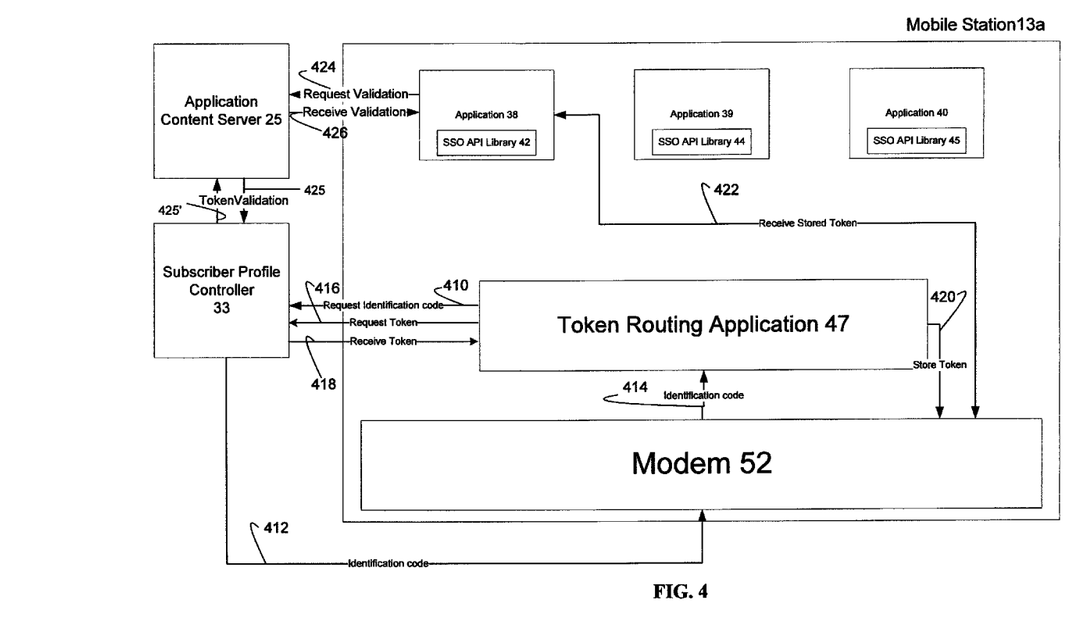

FIG. 4 illustrates an implementation of remote authentication using SSO credentials where a SSO authentication token is received by a token routing application 47 and then stored in a memory of the cellular modem 52 for subsequent retrieval by the application 38. The routing application 47 may initiate a request for a SSO authentication token on behalf of one or more of applications 38, 39 or 40. In this way, the routing application 47 may act as an intermediary between the subscriber profile controller 33 and applications 38, 39 and 40.

Referring to FIG. 4, a process for secure receipt and sharing of a SSO authentication token between applications can be initiated when a request for an identification code is provided from the token routing application 47 on mobile station 13a to the subscriber profile controller 33 (step 410).

Responsive to the request for the identification code provided by the token routing application 47, the identification code may be received as a messaging service message (e.g., Short Messaging Service (SMS) message) from the subscriber profile controller 33 (step 412) and provided to the token routing application 47 on mobile station 13a (step 414). As discussed above, the messaging service message may be provided via the cellular modem 52 of mobile station 13a.

Upon receipt of the identification code at the token routing application 47, the application requests a SSO authentication token from subscriber profile controller 33 (step 416). As an example, the application 38 may use the received identification code and device information of the mobile station 13a, including, but not limited to, a device operating system version, a MDN and SIM credential of the mobile station 13a, to generate a hash value. The hash value may be generated by SSO function library 42. The hash value may be provided by the application 38 to the subscriber profile controller 33 in the request for the authentication token. In some aspects, the subscriber profile controller 33 may verify the hash value against a subscriber database prior to providing an authentication token to the application 38.

The subscriber profile controller 33 provides the SSO authentication token to the token routing application 47 using the encrypted transport protocol (step 418). Upon receipt of the SSO authentication token at the application 38, the token routing application 47 may store the received SSO authentication token in a memory of the cellular modem 52 (step 420). Such storage may be performed, for example, by using a modem tunnel Application Programming Interface (API). The stored SSO authentication token may be retrieved from the memory of the modem 52 by application 38 (step 422). Such retrieval may be performed, for example, by using the model tunnel API.

Upon receipt of the SSO authentication token at the application 38, the retrieved SSO authentication token (e.g. SSO token) can be provided by the application 38 to an application content server 25 to authenticate the application 38 with the application content server 25 (step 424). Additionally, the application content server 25 may additionally validate the token with the subscriber profile controller 33. For example, the subscriber profile controller 33 may receive the authentication token from application content server 25 (step 425), check the authentication token against a database of one or more authorized authentication tokens and provide the validated the authentication token to the application content server (step 425'). When the application content server 25 authenticates the SSO authentication token (step 426), the application content server 25 can allow content transfer between the application content server 25 and the application 38.

In this way, a SSO authentication token can be received securely by the token routing application 47 via an encrypted transport protocol and the use of an identification code directed to the token routing application 47. In addition, once a SSO authentication token has been retrieved from the memory of the cellular modem 52, the SSO authentication token may be securely routed and shared by the token routing application 47 with other applications 38, 39 and 40 on mobile station 13a. Routing rules, defined by token routing application 47, may be read by an operating system of mobile station 13a to route the message to an application on the mobile station 13a. In this way, in some implementations, the token routing application 47 may configure routing of an authentication token to a requesting application (e.g., application 38) based on routing rules defined by the token routing application 47.

The application 38 may not be able to request an authentication token until it has received the identification code authorizing the application to proceed with the request for the authentication token. This allows only authorized applications (i.e., applications that possess an identification code from subscriber profile controller 33) to obtain a SSO authentication token. Other un-authorized applications, including processes that may have malicious intent to improperly retrieve a user's SSO authentication token, are not able to retrieve the SSO authentication token from subscriber profile controller 33. This not only improves security of the SSO authentication token but also security of a user's account with an application.

Figure 5:
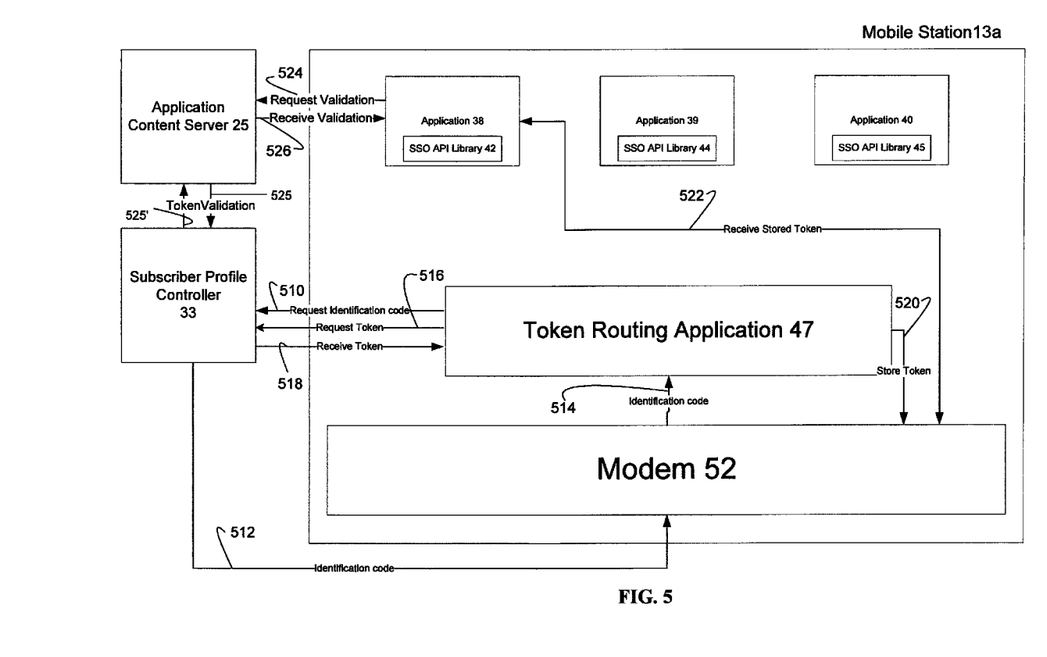

FIG. 5 illustrates an implementation of remote authentication using SSO credentials where a SSO authentication token is received by the token routing application 47 and then encrypted using public-key cryptography. Public-key cryptography, also known as asymmetric cryptography, can refer to a cryptographic algorithm which may use two separate keys one of which is secret (or private) and one of which is public. Although different, the two parts of this key pair may be mathematically linked. The public key is used to encrypt data; whereas the private key is used to decrypt encrypted data. Simply stated, in public-key encryption, a message can be encrypted with a recipient's public key. The message cannot be decrypted by anyone who does not possess the matching private key, who is thus presumed to be the owner of that key and the person associated with the public key. This ensures security of the message or any other confidential data.

Referring to FIG. 5, in an implementation, a process for secure receipt and sharing of a SSO authentication token between applications can be initiated when a request for an identification code is provided from the token routing application 47 on mobile station 13a to the subscriber profile controller 33 (step 510). The request may be provided by the token routing application 47 using the SSO function library 42 through an encrypted transport protocol.

Responsive to the request for the identification code provided by the token routing application 47, the identification code is received as a messaging service message (e.g., Short Messaging Service (SMS) message) from the subscriber profile controller 33 (step 512) and provided to the token routing application 47 on mobile station 13a (step 514). As discussed above, the messaging service message may be provided via a cellular modem 52 of mobile station 13a.

Upon receipt of the identification code at the token routing application 47, the token routing application 47 requests a SSO authentication token from subscriber profile controller 33 (step 516). As an example, the application 38 may use the received identification code and device information of the mobile station 13a, including, but not limited to, a device operating system version, a MDN and SIM credential of the mobile station 13a to generate a hash value. The hash value may be generated by SSO function library 42. The hash value may be provided by the application 38 to the subscriber profile controller 33 in the request for the authentication token. In some aspects, the subscriber profile controller 33 may verify the hash value against a subscriber database prior to providing an authentication token to the application 38.

The subscriber profile controller 33 provides the SSO authentication token to the token routing application 47 using the encrypted transport protocol (step 518).

Upon receipt of the SSO authentication token at the application 38, the token routing application 47 may store the received SSO authentication token in a memory of the cellular modem 52 (step 520). Such storage may be performed, for example, by using a modem tunnel Application Programming Interface (API). In addition the SSO authentication token may be encrypted with a private key. The private key may be further encrypted with a different public key. In this way, the stored authentication token remains in an encrypted state to keep the authentication token secure.

The stored SSO authentication token may be retrieved from the memory of the cellular modem 52 by application 38 (step 522). Such retrieval may be performed, for example, by using the model tunnel API. When the SSO authentication token has been encrypted with the private key, the application 38 may decrypt the private key with the public key and then further decrypt the encrypted SSO authentication token with the decrypted private key.

Upon receipt of the decrypted SSO authentication token at the application 38 (step 522), the retrieved SSO authentication token (e.g. SSO token) can be provided by the application 38 to an application content server 25 to authenticate the application 38 with the application content server 25 (step 524). Additionally, the application content server 25 may also validate the token with the subscriber profile controller 33. For example, the subscriber profile controller 33 may receive the authentication token from application content server 25 (step 525), check the authentication token against a database of one or more authorized authentication tokens and provide the validated the authentication token to the application content server (step 525'). When the application content server 25 authenticates the SSO authentication token (step 526), the application content server 25 can allow content transfer between the application content server 25 and the application 38.

In this way, a SSO authentication token can be received securely by the token routing application 47 via an encrypted transport protocol and the use of an identification code directed to the token routing application 47. In addition, once an application SSO authentication token has been retrieved, the SSO authentication token may be securely routed and shared by an operating system of mobile station 13a, based on routing rules defined by token routing application 47, with other applications 38, 39 and 40 on mobile station 13a. Routing rules, defined by the token routing application 47, may be read by an operating system of mobile station 13a to route the message to an application on the mobile station 13a. In this way, in some implementations, the token routing application 47 configure routing of an authentication token to a requesting application (e.g., application 38) based on routing rules defined by the token routing application 47. The application 38 may not be able to request an authentication token until it has received the identification code authorizing the application to proceed with the request for the authentication token. This allows only authorized applications (i.e., applications that possess an identification code from subscriber profile controller 33) to obtain an SSO authentication token. Other un-authorized applications, including processes that may have malicious intent to improperly retrieve a user's SSO authentication token, are not able to retrieve the SSO authentication token from subscriber profile controller 33. This not only improves security of the SSO authentication token but also security of a user's account with an application.

The remote authentication service under consideration here may be delivered to touch screen type mobile stations as well as to non-touch type mobile stations. Hence, our simple example shows the mobile station (MS) 13a as a non-touch type mobile station and shows the mobile station (MS) 13 as a touch screen type mobile station. An implementation of the remote authentication service using SSO credentials will involve at least some execution of programming in the mobile stations as well as implementation of user input/output functions and data communications through the network 15, from the mobile stations.

Those skilled in the art presumably are familiar with the structure, programming and operations of the various types of mobile stations. However, for completeness, it may be useful to consider the functional elements/aspects of two exemplary mobile stations 13a and 13b, at a high-level.

Figure 6:
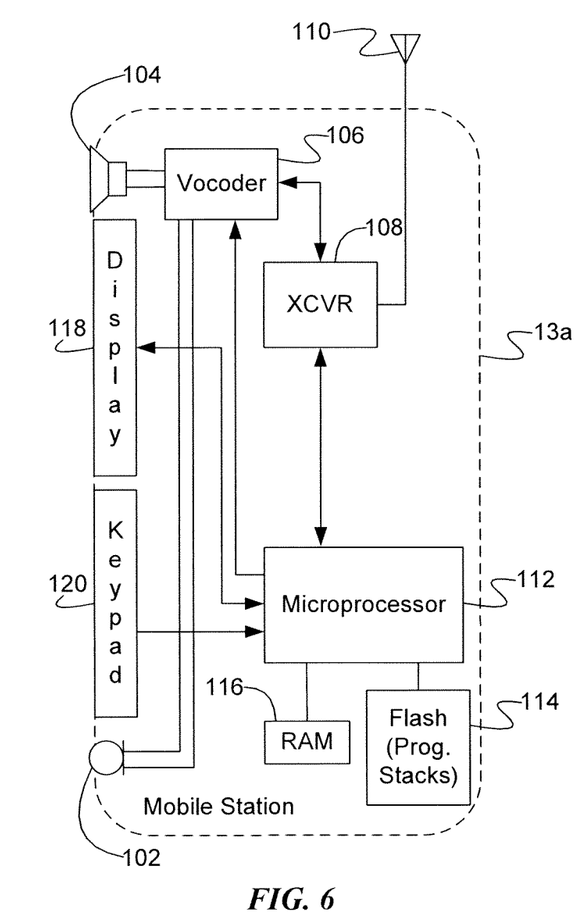
FIG. 6 is a high-level functional block diagram of an exemplary non-touch type mobile station as may utilize remote authentication using SSO through a network/system like that shown in FIG. 1.

For purposes of such a discussion, FIG. 6 provides a block diagram illustration of an exemplary non-touch type mobile station 13b. Although the mobile station 13b may be a smartphone or may be incorporated into another device, such as a personal digital assistant (PDA) or the like, for discussion purposes, the illustration shows the mobile station 13b is in the form of a handset. The handset embodiment of the mobile station 13b functions as a normal digital wireless telephone station. For that function, the station 13b includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13b also includes at least one digital transceiver (XCVR) 108. Today, the handset 13b would be configured for digital wireless communications using one or more of the common network technology types. The concepts discussed here encompass embodiments of the mobile station 13b utilizing any digital transceivers that conform to current or future developed digital wireless communication standards. The mobile station 13b may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile station 13b includes a display 118 for displaying messages, menus or the like, call related information dialed by the user, calling party numbers, etc., including any messages relating to remote authentication using SSO credentials. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during remote authentication using SSO credentials. For example, user interface elements may be used to receive user permission related to remote authentication using SSO credentials.

A microprocessor 112 serves as a programmable controller for the mobile station 13b, in that it controls all operations of the mobile station 13b in accord with programming that it executes, for all normal operations, and for operations involved in the remote authentication procedure under consideration here. In the example, the mobile station 13b includes flash type program memory 114, for storage of various "software" or "firmware" program routines and mobile configuration settings, such as mobile directory number (MDN) and/or mobile identification number (MIN), etc. The mobile station 13b may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile station 13b includes a processor, and programming stored in the flash memory 114 configures the processor so that the mobile station is capable of performing various desired functions, including in this case the functions involved in the technique for providing remote authentication using SSO credentials.

Figure 7:
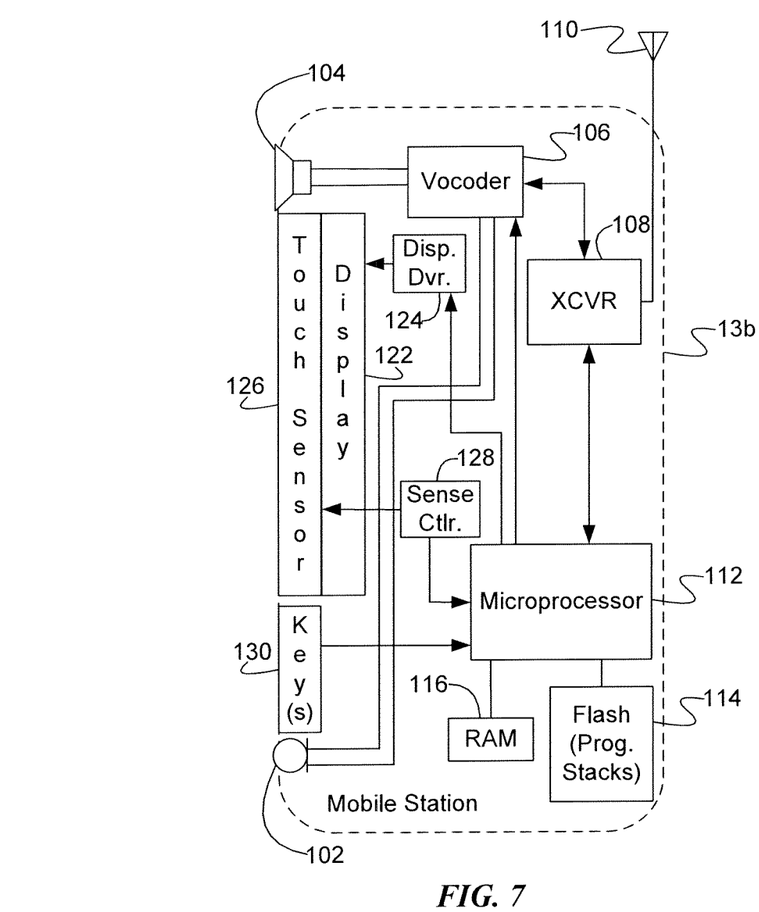
FIG. 7 is a high-level functional block diagram of an exemplary touch screen type mobile station as may utilize remote authentication using SSO through a network/system like that shown in FIG. 1.

For purposes of such a discussion, FIG. 7 provides a block diagram illustration of an exemplary touch screen type mobile station 13a. Although possible configured somewhat differently, at least logically, a number of the elements of the exemplary touch screen type mobile station 13a are similar to the elements of mobile station 13a, and are identified by like reference numbers in FIG. 7. For example, the touch screen type mobile station 13a includes a microphone 102, speaker 104 and vocoder 106, for audio input and output functions, much like in the earlier example. The mobile station 13a also includes at least one digital transceiver (XCVR) 108, for digital wireless communications, although the handset 13a may include an additional digital or analog transceiver. The concepts discussed here encompass embodiments of the mobile station 13a utilizing any digital transceivers that conform to current or future developed digital wireless communication standards. As in the station 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13a and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of station 13a, a microprocessor 112 serves as a programmable controller for the mobile station 13a, in that it controls all operations of the mobile station 13a in accord with programming that it executes, for all normal operations, and for operations involved in the remote authenticating procedure under consideration here. In the example, the mobile station 13a includes flash type program memory 114, for storage of various program routines and mobile configuration settings. The mobile station 13a may also include a non-volatile random access memory (RAM) 116 for a working data processing memory. Of course, other storage devices or configurations may be added to or substituted for those in the example. Hence, outlined above, the mobile station 13a includes a processor, and programming stored in the flash memory 114 configures the processor so that the mobile station is capable of performing various desired functions, including in this case the functions involved in the technique for providing remote authentication using SSO credentials.

In the example of FIG. 7, the user interface elements included a display and a keypad. The mobile station 13a may have a limited number of key 130, but the user interface functions of the display and keypad are replaced by a touch-screen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13a includes a display 122, which the microprocessor 112 controls via a display driver 124, to present visible outputs to the device user. The mobile station 13a also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile station 13a. The microphone 102 and speaker 104 may be used as additional user interface elements, for audio input and output, including with respect to some authentication related functions.

The structure and operation of the mobile stations 13a and 13b, as outlined above, were described to by way of example, only.

As shown by the above discussion, functions relating to the an enhanced authentication experience for remote authentication, via a graphical user interface of a mobile station may be implemented on computers connected for data communication via the components of a packet data network, operating as an subscriber profile controller 33 and/or as an content server 25 as shown in FIG. 1. Although special purpose devices may be used, such devices also may be implemented using one or more hardware platforms intended to represent a general class of data processing device commonly used to run "server" programming so as to implement the remote authentication functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for remote authentication using SSO credentials. The software code is executable by the general-purpose computer that functions as the subscriber profile controller and/or that functions as an application 38 at mobile station 13a. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for remote authentication using SSO credentials, in essentially the manner performed in the implementations discussed and illustrated herein.

Figures 8, 9:
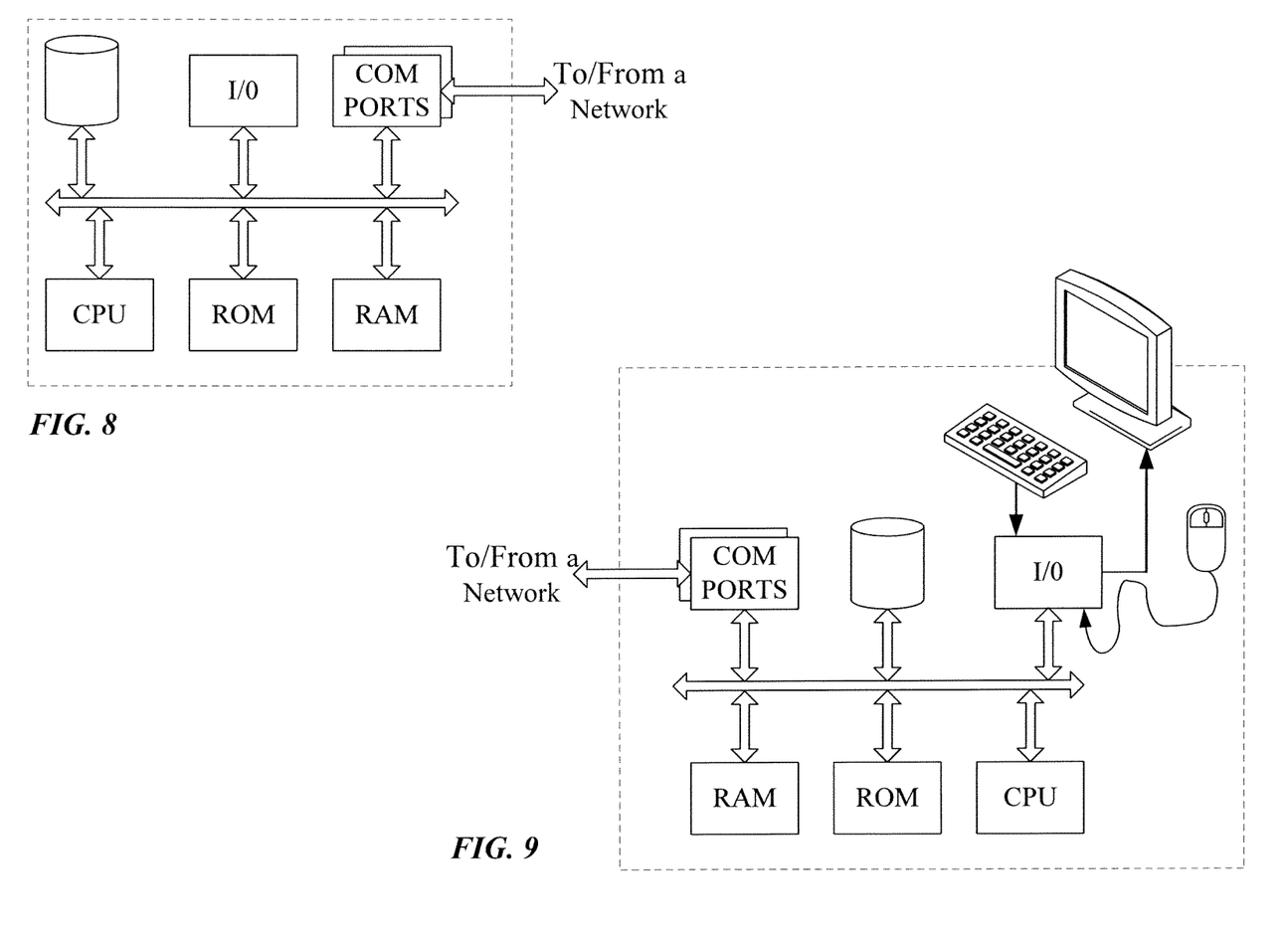
FIG. 8 is a simplified functional block diagram of a computer that may be configured as a host or server, for example, to function as the subscriber profile controller of the system of FIG. 1.
FIG. 9 is a simplified functional block diagram of a personal computer or other work station or terminal device.

FIGS. 8 and 9 provide functional block diagram illustrations of general purpose computer hardware platforms. FIG. 8 illustrates a network or host computer platform, as may typically be used to implement a server. FIG. 9 depicts a computer with user interface elements, as may be used to implement a personal computer or other type of work station or terminal device, although the computer of FIG. 9 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 6). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of remote authentication outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the network 29 into the computer platform of the network 23 that can include the content server 25. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Nonvolatile storage media include, for example, optical or magnetic disks, such as any of the storage devices in any computer(s) or the like, such as may be used to implement remote authentication using SSO, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    transmitting a request for an identification code from an application at a user device to a wireless service provider, the request provided through an encrypted transport protocol via an IP type packet data network;
    receiving the identification code at the user device in a messaging service message from the wireless service provider;
    securely routing the received identification code to the requesting application at the user device;
    upon receipt of the identification code at the application, retrieving an authentication token for the application at the user device through the encrypted transport protocol; and
    providing the authentication token from the user device to an application content server to allow content transfer between the application content server and the application.

2. The method of claim 1, wherein the application content server is configured to provide the authentication token to the wireless service provider to validate the application prior to the content transfer.

3. The method of claim 1, wherein securely routing the received identification code to the requesting application includes preventing other applications from accessing the identification code during the routing to the requesting application.

4. The method of claim 1, wherein the requesting and the retrieving is performed through a single sign-on (SSO) dynamic-link library (DLL).

5. The method of claim 1, wherein
    the request for the identification code is provided via Hyper Text Transfer Protocol-Secure (HTTPS); and
    receiving the identification code includes receiving the identification code in an SMS message from the wireless service provider.

6. The method of claim 1, wherein the identification code is received at a modem of a mobile device.

7. The method of claim 1, wherein the request for the identification code is provided to a subscriber profile controller of the wireless service provider.

8. The method of claim 1, further comprising:
storing the received authentication token in a memory of a modem of a mobile device; and
encrypting the stored identification token with a private key, wherein the private key is further encrypted with a public key.

9. The method of claim 8, further comprising:
decrypting the encrypted private key; and
decrypting the encrypted stored authentication token with the decrypted private key prior to providing the decrypted authentication token to an application content server.

10. A mobile device, comprising:
a transceiver configured to enable communication of digital information via a mobile network;
a processor coupled with the transceiver;
a storage device accessible to the processor; and
an executable program in the storage device, wherein execution of the program by the processor configures the mobile device to perform functions, including functions to:
transmit a request for an identification code from an application at the mobile
device to a wireless service provider, the request provided through an encrypted transport protocol via an IP type packet data network;
receive the identification code at the mobile device in a messaging service message from the wireless service provider;
securely route the received identification code to the requesting application at the mobile device; upon receipt of the identification code for the application at the mobile device, retrieve an authentication token for the application through the encrypted transport protocol; and
provide the authentication token to an application content server to allow content transfer between the application content server and the application at the mobile device.

11. The mobile device of claim 10, wherein the application content server is configured to provide the authentication token to the wireless service provider to validate the application prior to the content transfer.

12. The mobile device of claim 10, wherein securely routing the received identification code to the requesting application includes functions to:
prevent other applications from accessing the identification code during the routing to the requesting application.

13. The mobile device of claim 10, wherein the request and the retrieval is performed through a single sign-on (SSO) dynamic-link library (DLL).

14. The mobile device of claim 10, wherein execution of the program by the processor configures the mobile device to perform functions, including functions to:
transmit the request for the identification code via Hyper Text Transfer Protocol-Secure (HTTPS); and
receive the identification code in an SMS message from the wireless service provider.

15. The mobile device of claim 10, wherein the identification code is received at a modem included in the mobile device.

16. The mobile device of claim 10, wherein the request for the identification code is provided to a subscriber profile controller of the wireless service provider.

17. The mobile device of claim 10, wherein execution of the program by the processor configures the mobile device to perform functions, including functions to:
store the received the received authentication token in a memory of a cellular modem of a mobile device; and
encrypt the stored identification token with a private key, wherein the private key is further encrypted with a public key.

18. The mobile device of claim 17, wherein execution of the program by the processor configures the mobile device to perform functions, including functions to:
decrypt the encrypted private key; and
decrypt the encrypted stored authentication token with the decrypted private key prior to providing the decrypted authentication token to the application content server.

19. A non-transitory computer-readable medium comprising instructions which, when executed by one or more computers, cause the one or more computers to:
transmit a request for an identification code from an application at a user device to a wireless service provider, the request provided through an encrypted transport protocol via an IP type packet data network;
receive the identification code at the user device in a messaging service message from the wireless service provider;
securely route the received identification code to the requesting application at the user device;
upon receipt of the identification code at the application, retrieve an authentication token for the application at the user device through the encrypted transport protocol; and
provide the authentication token from the user device to an application content server to allow content transfer between the application content server and the application.

20. The computer-readable medium of claim 19, wherein the application content server is configured to provide the authentication token to the wireless service provider to validate the application prior to the content transfer.

* * * * *